United States Patent [19]

Beal, III et al.

[11] 3,759,965

[45] Sept. 18, 1973

[54] PGA$_2$

[75] Inventors: Philip F. Beal, III; John E. Pike, both of Kalamazoo, Mich.

[73] Assignee: The Upjohn Company, Kalamazoo, Mich.

[22] Filed: June 28, 1971

[21] Appl. No.: 157,713

Related U.S. Application Data

[63] Continuation-in-part of Ser. No. 82,121, Oct. 16, 1970, abandoned, which is a continuation-in-part of Ser. No. 520,876, Jan. 17, 1966, abandoned, which is a continuation-in-part of Ser. No. 480,107, Aug. 16, 1965, abandoned.

[52] U.S. Cl....... 260/468 D, 260/211 R, 260/247.2, 260/268 MK, 260/268 R, 260/293.65, 260/326.3, 260/410, 260/429.9, 260/439 R, 260/448 R, 260/488 R, 260/501.1, 260/501.15, 260/501.17

[51] Int. Cl....................... C07c 61/32, C07c 69/74

[58] Field of Search.................... 260/468 D, 514 D

[56] References Cited
OTHER PUBLICATIONS

Hamburg et al., J. Biol. Chem. 241, 257 (1966)

*Primary Examiner*—Lorraine A. Weinberger
*Assistant Examiner*—Robert Gerstl
*Attorney*—Morris L. Nielsen et al.

[57] ABSTRACT

This invention is a group of novel prostanoic acid derivatives, namely prostaglandin A$_2$ (PGA$_2$), prostaglandin A$_3$ (PGA$_3$), and 13,14-dihydroprostaglandin A$_1$ (13,14-dihydro-PGA$_1$), and the salts, esters, formates and alkanoates of those. These novel compounds are useful as antisecretory agents, vasodepressors, oxytocic agents, and abortifacients. These novel compounds are also useful to manage cases of renal disfunction and to regulate the menstrual cycle of women.

6 Claims, No Drawings

PGA

CROSS REFERENCE TO RELATED APPLICATIONS

This application is a continuation-in-part of our co-pending application Ser. No. 82,121, filed Oct. 16, 1970, and now abandoned, which is a continuation-in-part of our co-pending application Ser. No. 520,876 filed Jan. 17, 1966, and now abandoned, which is a continuation-in-part of our co-pending application Ser. No. 480,107, filed Aug. 16, 1965, and now abandoned.

DESCRIPTION OF THE INVENTION

This invention relates to novel compositions of matter, and is more specifically concerned with novel organic compounds of the formula:

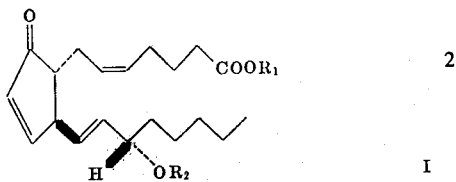

wherein $R_1$ is hydrogen or methyl, and $R_2$ is hydrogen or acetyl, and the pharmacologically acceptable salts thereof when $R_1$ is hydrogen, said compounds being essentially free of the other components of colonies of the subclass Octocorallia, and essentially free of pyrogens, antigens, proteins, enzymes, cellular material, and other organic acids or salts thereof.

This invention is also concerned with novel organic compounds of the formula:

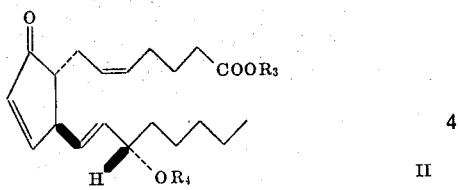

wherein $R_3$ is hydrogen or alkyl of one to 8 carbon atoms, inclusive, and $R_4$ is hydrogen, formyl, or alkanoyl of two to 8 carbon atoms, inclusive, with the proviso that when $R_3$ is hydrogen or methyl, $R_4$ is not hydrogen or acetyl, and the pharmacologically acceptable salts thereof when $R_3$ is hydrogen.

This invention is also concerned with novel organic compounds of the formula:

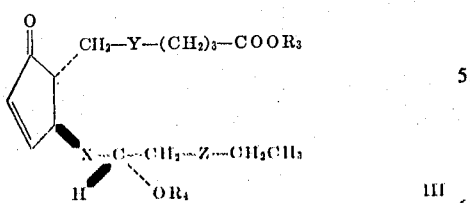

wherein X, Y, and Z are $-CH_2CH_2-$, or X is trans-$CH=CH-$, and Y and Z are cis-$CH=CH-$, wherein $R_3$ is hydrogen or alkyl of one to 8 carbon atoms, inclusive, wherein $R_4$ is hydrogen, formyl, or alkanoyl of two to 8 carbon atoms, inclusive, and the pharmacologically acceptable salts thereof when $R_3$ is hydrogen.

These novel compounds of Formulas I, II, and III are derivatives of prostanoic acid which has the formula and atom numbering:

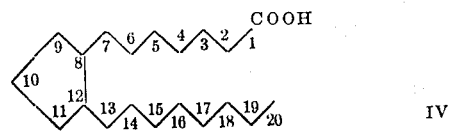

Based on Formula IV, the compound represented by Formula I wherein $R_1$ and $R_2$ are hydrogen has the name 15(S)-hydroxy-9-oxoprosta-cis-5, 10-trans-13-trienoic acid. Another name for this compound is prostaglandin $A_2$ ($PGA_2$). The compounds of Formula II are all alkyl and/or formate or alkanoate derivatives of the same trienoic acid of Formula I. The compound of Formula III wherein X, Y, and Z are $-CH_2CH_2-$, and $R_3$ and $R_4$ are hydrogen has the name 15(S)-hydroxy-9-oxoprosta-10-enoic acid. Another name for this compound is 13,14-dihydro-prostaglandin $A_1$ (13,14-dihydro-$PGA_1$). The compound of Formula III wherein X is trans-$CH=CH-$, Y and Z are cis-$CH=CH-$, and $R_3$ and $R_4$ are hydrogen has the name 15(S)-hydroxy-9-oxoprosta-cis-5,10-trans-13,-cis-17-tetraenoic acid. Another name for this compound is prostaglandin $A_3$ ($PGA_3$).

Molecules of the compounds encompassed by Formulas I, II, and III each have several centers of asymmetry. Formulas I, II, and III are intended to represent optically active compounds each with the same absolute configuration as optically active prostaglandin $E_1$ ($PGE_1$) obtained from certain mammalian tissues, for example, sheep vesicular glands or human seminal plasma. See, for example, Bergstrom et al., J. Biol. Chem. 238, 3,555 (1963), Horton, Experientia, 21, 113 (1965), Bergstrom et al., Pharmacol. Rev. 20, 1 (1968), and references cited in those.

In Formulas I, II, III, and IV, a broken line attachment to the cyclopentane ring indicates a chain in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in Formulas I, II, and III is S. See Nature, 212, 38 (1966) for discussion of the stereo-chemistry of the prostaglandins.

$PGA_2$, $PGA_3$, 13,14-dihydro-$PGA_1$, and their alkyl esters, alkanoates and formates, alkyl ester alkanoates and formates, and pharmacologically acceptable salts of the acid forms of those are useful in mammals, including man and certain useful animals, e.g., dogs and pigs, to reduce and control excessive gastric secretion, thereby reducing or avoiding gastrointestinal and duodenal ulcer formation, and accelerating the healing of such ulcers already present in the gastrointestinal and duodenal tracts. For this purpose, the compounds are injected or infused intravenously, subcutaneously, or intramuscularly in an infusion dose range about 0.1 μg. to about 500 μg. per kg. of body weight per minute, or in a total daily dose by injection or infusion in the range about 0.1 to about 20 mg. per kg. of body weight per day, or are administered orally in the range 0.1 to 50 mg. per kg. of body weight per day, the exact dose depending on the age, weight, and condition of the patient or animal, and on the frequency and route of administration.

The novel prostanoic acid derivatives of Formulas I, II, and III also exhibit vasodepressor activity in the normotensive state when assayed in dogs prepared according to the technique of Lee et al., Circulation Res. 13, 359 (1963). These dogs are anesthetized, vagotomized, and pentolinium treated (AVPT dogs). The material to be assayed is administered in ethyl alcohol which is diluted to 1 to 10 with physiological saline or 5 percent dextrose for intravenous injection. Because of this vasodepressor activity, these novel compounds are useful as hypotensive agents to reduce blood pressure in mammals, including man. For this purpose, the compounds are administered orally or parenterally, e.g., by intravenous infusion at the rate about 0.01 to about 50, preferably 0.1 to 5, µg. per kg. of body weight per minute, or in single or multiple doses of about 25 to 500 µg. per kg. of body weight total per day.

It is known that other prostanoic acid derivatives lower systemic arterial blood pressure when injected intravenously, especially those substances known as the prostaglandins E, e.g., $PGE_2$, $PGE_3$, and dihydro-$PGE_1$. Those substances, however, also have a strong stimulatory action on smooth muscle and antagonize epinephrine-induced mobilization of free fatty acids. It was quite surprising and unexpected, therefore, that the novel Formula-I, -II, and -III compounds of this invention have far less smooth muscle stimulatory effect as shown, for example, by tests on strips of guinea-pig and rabbit smooth muscle than, for example, $PGE_2$, and far less antagonism of epinephrine-induced mobilization of free fatty acids than, for example, $PGE_2$. Therefore, the novel Formula-I, -II, and -III compounds of this invention are especially useful for the above-described purposes because they are substantially more specific in their action and result in substantially lesser side effects.

Also, these novel Formula-I, -II, and -III prostaglandins A and derivatives and salts thereof increase the flow of blood in the mammalian kidney, thereby increasing volume and electrolyte content of the urine. Therefore, these compounds are useful in managing cases of renal disfunction, especially in cases of severely impaired renal blood flow, for example, the hepatorenal syndrome and early kidney transplant rejection. In cases of excessive or inappropriate ADH (antidiuretic hormone; vasopressin) secretion, the diuretic effect of these novel compounds is even greater. In anephretic states, the vasopressin action of these novel compounds is especially useful. Illustratively, the compounds are useful to alleviate and correct cases of edema resulting, for example, from massive surface burns, and in the management of shock. For these purposes, the compounds are preferably first administered by intravenous injection at a dose in the range 10 to 1,000 µg. per kg. of body weight or by intravenous infusion at a dose in the range 0.1 to 20 µg. per kg. of body weight per minute until the desired effect is obtained. Subsequent doses are given by intravenous, intramuscular, or subcutaneous injection or infusion in the range 0.05 to 2 mg. per kg. of body weight per day.

The novel Formula-I, -II, and -III prostaglandins A and derivatives and salts thereof are also useful for controlling the reproductive cycle in ovulating female mammals including humans and animals such as monkeys, rats, rabbits, cats, dogs, cattle, and the like. By the term ovulating female mammals is meant animals which are mature enough to ovulate but not so old that regular ovulation has ceased. For this use, these novel compounds are used in the same manner already described for the corresponding prostaglandins F. See, for example, Belgian Pat. No. 738,177, reprinted in Derwent Central Patents Index, Complete Specifications, Farmdoc Book No. 33, Week R. 10. Specification No. 16,629 R (Apr. 21, 1970).

These novel Formula-I -II, and -III prostaglandins A and derivatives and salts thereof are also useful to induce labor in female mammals, including women, at or near term and to induce therapeutic abortion. For these purposes, the novel compounds are used in the same manner as already described in the art for the use of prostaglandins E and F for those same purposes. See, for example, Karim, British Medical Journal, 3, 196 (1970) and Karim et al., ibid., 198 (1970), and reference cited in those.

For all of the above purposes, these novel Formula-I, -II, and -III prostaglandins A are used in free acid form, in pharmacologically acceptable salt form, as alkyl esters, as formates or alkanoates either in free acid form or in salt form, or in alkyl ester formate or alkyl ester alkanoate form.

When the ester form is used, any alkyl ester is used wherein the alkyl moiety contains one to 8 carbon atoms, inclusive, i.e., methyl, ethyl, propyl, butyl, pentyl, hexyl, heptyl, octyl, and isomeric forms thereof. However, it is preferred that the ester be alkyl of one to four carbon atoms, inclusive. Of those alkyl, methyl and ethyl are especially preferred for optimum absorption of the compound by the body or experimental animal system.

When the alkanoate form is used, any alkanoate is used wherein the alkanoyl moiety contains 2 to 8 carbon atoms, inclusive, i.e., acetyl, propionyl, butyryl, valeryl, hexanoyl, heptanoyl, octanoyl, and isomeric forms thereof. Of those, acetyl is especially preferred for optimum absorption of the compound by the body or experimental animal system.

Pharmacologically acceptable salts of these prostaglandin analogs useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and the like, aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2methyl-1-propanol, tris(hydroxymethyl)aminomethane, N-phenylethanolamine, N-(p-tert-amylphenyl)diethanolamine, galactamine, N-methylglycamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethyl-ammonium, and the like.

As discussed above, the novel compounds of Formulas I, III, and III are administered in various ways, e.g., intravenously, intramuscularly, subcutaneously, orally, intravaginally, rectally, buccally, sublingually, topically, and in the form of sterile implants for prolonged action.

For intravenous injection or infusion, sterile aqueous isotonic solutions are preferred. For that purpose, it is preferred because of increased water solubility that $R_1$ in the Formula-I, -II, and -III compounds be hydrogen or a pharmacologically acceptable cation. For subcutaneous or intramuscular injection, sterile solutions or suspensions of the acid, salt, or ester form in aqueous or non-aqueous media are used. Tablets, capsules, and liquid preparations such as syrups, elixirs, and simple solutions, with the usual pharmaceutical carriers are used for oral or sublingual administration. For rectal or vaginal administration, suppositories prepared as known in the art are used. For tissue implants, a sterile tablet or silicone rubber capsule or other object containing or impregnated with the substance is used.

The novel acids and alkyl esters of Formulas I, II, and III wherein $R_2$ and $R_4$ are hydrogen are prepared by dehydration of the corresponding prostaglandin E (PGE) acids or esters, all of which are known in the art or are prepared by methods known in the art. See, for example, British specifications 851,827 and 1,040,544. For example, dehydration of $PGE_2$ gives $PGA_2$, the compound of Formula 1 wherein $R_1$ and $R_2$ are hydrogen. Similarly, dehydration of $PGE_3$ and dihydro-$PGE_1$ give $PGA_3$ and 13,14-dihydro-$PGA_1$, respectively.

Similarly, dehydration of each of the various alkyl esters of $PGE_2$, $PGE_3$, and dihydro-$PGE_1$ gives the corresponding alkyl ester of $PGA_2$, $PGA_3$, and 13,14-dihydro-$PGA_1$, respectively.

These dehydrations are carried out under acidic conditions. A mixture of about 9 parts of acetic acid and one part of water is a satisfactory dehydration medium, the prostaglandin E free acid or alkyl ester being dissolved in that mixture, and the solution being heated, advantageously in the range 50° to 100° C. for about 5 to about 30 hours, and advantageously in the absence of air. Dilute aqueous solutions of mineral acids, e.g., hydrochloric acid, especially in the presence of a solubilizing diluent, e.g., tetrahydrofuran, are also useful as media for these dehydrations, although these media may also cause partial hydrolysis of an ester reactant.

As discussed above, these prostaglandin E reactants cause some of the same pharmacological responses as the novel prostaglandins A of this invention. However, these same prostaglandin E also cause other pharmacological responses, e.g., smooth muscle stimulation, which for some pharmacological purposes would cause unwanted animal organism responses. For those purposes, it is desirable that the prostaglandin A product be essentially free of the corresponding prostaglandin E reactant. In other words, it is desirable that each of the novel prostaglandin A products of this invention be essentially free of compounds with a C-11 hydroxy moiety and a carbon-carbon single bond between C-10 and C-11. By the term "essentially free" here is meant a degree of freedom from this prostaglandin E impurity such that the prostaglandin A is suitable for its intended pharmacological use.

This degree of purity is readily accomplished. The prostaglandin A products are uniformly more polar than the corresponding prostaglandin E reactants. Because of that, a prostaglandin A product and the corresponding prostaglandin E reactant are easily separated by chromatography, for example, by thin layer or column chromatography on silica gel. With the use of thin layer chromatography (TLC), e.g., silica gel plates using acetic acid:methanol:chloroform (5:5:90), the course of the dehydration reaction is easily followed. Small aliquots of the reaction mixture are taken during the reaction. When a chromatographic spot corresponding to the prostaglandin E reactant no longer appears on the thin layer plate during chromatography, then the reaction is complete and the amount of reactant to be removed from the desired product will be minimal.

The isolation and purification of the desired Formula-I, -II, or -III prostaglandin A product to a state esstentially free of the corresponding prostaglandin E reactant and the other components of the dehydration reaction mixture is exemplified hereinafter.

When a Formula-I, -II, or -III compound wherein $R_1$ is hydrogen is prepared by dehydration as described above, and an alkyl ester of that acid is desired, esterification is advantageously accomplished by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or are prepared by methods known in the art. See, for example, Organic Reactions, John Wiley & Sons, Inc., New York, N.Y., Vol. 8, pp. 389-394 (1954).

An alternative method for esterification of the carboxyl moiety of the Formula-I, -II, or -III acid comprises transformation of said acid to the corresponding silver salt, followed by interaction of the salt with an alkyl iodide. Examples of suitable iodides are methyl iodide, ethyl iodide, butyl iodide, isobutyl iodide, tert-butyl iodide, and the like. The silver salts are prepared by concentional methods, for example, by dissolving the acid in cold dilute aqueous ammonia, evaporating the excess ammonia at reduced pressure, and then adding the stoichiometric amount of silver nitrate.

When an alkanoate of a Formula-I, -II, or -III compound is desired for one of the above-described pharmacological purposes, i.e., wherein $R_2$ in Formula I is acetyl or $R_4$ in Formula II or $R_4$ in III is alkanoyl, that is prepared by reacting the corresponding hydroxy compound, i.e., $R_2$ or $R_4$ is hydrogen, with an alkanoic anhydride corresponding to an alkanoic acid of two to 8 carbon atoms, inclusive. Examples of these anhydrides are acetic anhydride, propionic anhydride, butyric anhydride, valeric anhydride, hexanoic anhydride, heptanoic anhydride, octanoic anhydride, and isomeric forms of those.

This reaction leading to these alkanoates is advantageously carried out by mixing the hydroxy compound and the acid anhydride, preferably in the presence of a tertiary amine such as pyridine or triethylamine. A substantial excess of the anhydride is used, preferably about 10 to 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction, as well as any free carboxyl groups present in the hydroxy compound reactant.

The reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The desired alkanoate is isolated from the reaction mixture by conventional methods. For example, the excess anhydride is decomposed with water, and the resulting mixture acidified and then extracted with a solvent such as diethyl ether. The desired alkanoate is recovered from the diethyl ether extract by evaporation. The alkanoate is then purified by conventional methods, advantageously by chromatography.

When a formate of a Formula-II or -III acid on alkyl ester is desired for one of the above-described pharmacological purposes, i.e., when $R_4$ in Formula II or III is formyl, that is prepared by formylation of the corresponding Formula-II or -III hydroxy acid or hydroxy alkyl ester, i.e., wherein $R_4$ is hydrogen. This formylation is carried out by procedures known in the art, for example, by reaction of the hydroxy compound with the mixed anhydride of acetic and formic acids or with formylimidazole. See, for example, Fieser et al., Reagents for Organic Synthesis, John Wiley & Sons, Inc., pp. 4 and 407 (1967) and references cited therein.

Each of the Formula-I, -II, and -III acids ($R_1$ is hydrogen) is transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

Since our invention of the novel Formula-I compound wherein $R_1$ and $R_2$ are hydrogen, i.e., $PGA_2$, that compound has also been obtained from human seminal plasma. See, for example, Hamberg et al., Proc. Nobel Symposium II, Stockholm (1966); Interscience Publishers, New York, p. 63 (1967), Biochem. Biophys. Acta, 106, 215 (1965), and J. Biol. Chem. 241,257 (1966). $PGA_2$ obtained from that source must, of course, be made essentially free of pyrogens, antigens, proteins, enzymes, cellular material, and extraction and purification solvents which are present in human seminal plasma or which are likely to contaminate the $PGA_2$ during the process for obtaining it as described in the Hamberg et al. references. By the term "essentially free" here is meant a degree of freedom from these impurities such that the $PGA_2$ is suitable for its intended pharmacological uses, including parenteral administration to humans.

Other prostanoic acid derivatives, e.g., $PGE_1$, $PGE_2$, $PGE_3$, $PGF_{1\alpha}$, and $PGF_{2\alpha}$, are also obtained from human seminal plasma. See, for example, the Hamberg et al. references cited above. Since those have different spectra of biological activity than $PGA_2$, for example, intense smooth muscle stimulatory activity, the $PGA_2$ obtained from human seminal plasma must be made essentially free of these other prostanoic acid derivatives and the salts thereof, and also essentially free of the other organic acids and salts thereof that are known to be obtained from human seminal plasma. By the term "essentially free" here is meant a degree of freedom from these organic acids and salts thereof, including these other prostanoic acid derivatives, such that the $PGA_2$ is suitable for its intended pharmacological uses, including parenteral administration to humans.

The novel prostanoic acid derivatives of Formula I, i.e., $PGA_2$, $PGA_2$ acetate, $PGA_2$ methyl ester, and $PGA_2$ acetate methyl ester are also obtained by extraction of colonies or colony pieces of the marine invertebrate Plexaura homomalla (Esper), 1792, forma S, and separating one, two, or all of those Formula-I prostanoic acid derivatives from the resulting extract.

Plexaura homomalla (Esper), 1792, forma S is a member of the subclass Octocorallia, order Gorgonacea, suborder Holaxonia, family Plexauridae, genus Plexaura. See, for example, Bayer, "The Shallow-Water Octocorallia of the West Indian Region," Martinus Nijhoff, The Hague (1961). Colonies of these Plexaura homomalla forms are abundant on the ocean reefs in the zone from the low-tide line to about 25 fathoms in the tropical and subtropical regions of the western part of the Atlantic Ocean, from Bermuda to the reefs of Brazil, including the eastern shore reefs of Florida, the Caribbean island and mainland reefs, and the Gulf of Mexico island and mainland reefs. These colonies are bush-like or small tree-like in habit, and are readily identified for collection as Plexaura homomalla (Esper), 1792, by those of ordinary skill in this art.

The production of $PGA_2$, $PGA_2$ methyl ester, and $PGA_2$ acetate methyl ester from colonies or colony pieces of Plexaura homomalla (Esper), 1792, forma S, is described hereinafter in Preparation 1 and Preparation 2.

$PGA_2$, $PGA_2$ methyl ester, and $PGA_2$ acetate methyl ester produced by the extraction processes of Preparation 1 or Preparation 2 must, of course, be made essentially free of the other components of colonies of the subclass Octocorallia. By the term "essentially free" here is meant a degree of freedom from these other components except, of course, water, such that the $PGA_2$, $PGA_2$ acetate, $PGA_2$ methyl ester, and $PGA_2$ acetate methyl ester are suitable for their intended pharmacological uses, including parenteral administration to humans. That degree of freedom from the other components is accomplished by the procedures of Preparation 1 or Preparation 2.

The invention can be more fully understood by the following preparations and examples.

All temperatures are in degrees centigrade.

Infrared absorption spectra are recorded on a Perkin-Elmer Model 421 infrared spectrophotometer. Except when specified otherwise, undiluted (neat) samples are used.

Ultraviolet spectra are recorded on a Cary Model 15 spectrophotometer.

NMR spectra are recorded on a varian A-60 spectrophotometer on deuterochloroform solutions with tetramethylsilane as an internal standard (downfield).

Mass spectra are recorded on an Atlas CH-4 mass spectrometer with a TO-4 source (ionization voltage 70 ev).

The collection of chromatographic eluate fractions starts when the eluant front reaches the bottom of the column.

"Brine," herein, refers to an aqueous saturated sodium chloride solution.

The A-IX solvent system used in thin layer chromatography (TLC) is made up from ethyl acetate-acetic acid-2,2,4-trimethylpentane-water (90:20:50:100) according to M. Hamberg and B. Samuelsson, J. Biol. Chem. 241, 257 (1966).

Preparation 1   $PGA_2$ from Plexaura homomalla (Esper), 1792, forma S

Colonies of Plexaura homomalla (Esper), 1792, forma S, collected from reefs off the north shore of Jamaica, are frozen by contact with solid carbon dioxide within one hour after removal from the reef waters. The frozen colonies are maintained in insulated boxes containing solid carbon dioxide (temperature below about −20° C.) until ready for thawing. Then, the frozen colonies (700 g.) are ground to a small particle size (Waring blender) and mixed with 1,500 ml. of water. The mixture is maintained about 20 hours at 25° C. with stirring. Then, the mixture is filtered through a pad of diatomaceous earth, and the filtrate is acidified with concentrated hydrochloric acid to pH about 2–3. The acidified filtrate is extracted four times with ethyl acetate. The extracts are combined, filtered, washed with saturated aqueous sodium chloride solution, dried with anhydrous sodium sulfate, and evaporated under reduced pressure to give 11 g. of oily residue.

The solid residue on the diatomaceous earth filter pad is stirred 2 hours in methanol (enough to cover said residue) at 25° C. The mixture is then filtered, and the filtrate is evaporated to give 14 g. of oily residue.

The two oily residues are combined and chromatographed on 1,500 g. of acid-washed silica gel, eluting successively with 8 l. of a 25 to 65% gradient of ethyl acetate in Skellysolve B, 8 l. of a 65 to 100% gradient of ethyl acetate in Skellysolve B, and 5 l. of a 2% methanol in ethyl acetate, collecting 500-ml. fractions. (Skellysolve B is a mixture of isomeric hexanes.) Fractions 8-12 are combined and evaporated to give a small amount of $PGA_2$ containing a trace of $PGA_2$ methyl ester. Fractions 15–18 are combined and evaporated to give 9.54 g. of $PGA_2$.

Preparation 2   $PGA_2$ Acetate Methyl Ester from Plexaura homomalla (Esper), 1792, forma S Colonies of Plexaura homomalla (Esper), 1792, forma S, collected from reefs off the north shore of Jamaica, are chopped into chunks several inches long. The chunks are frozen by contact with solid carbon dioxide within one hour after removal from the reef waters. The frozen colony pieces are maintained in insulated boxes containing solid carbon dioxide (temperature below about −20° C.) until the time for extraction. Then, the frozen colony pieces are ground to a small particle size (Mitts and Merrill hogger; average largest dimension about 5 mm). The particles (1,500 g.) are then stirred at high speed with 5 gallons of dichloromethane for 20 minutes at about 25° C. external temperature. The mixture of dichloromethane and particles is then filtered through a pad of diatomaceous earth, and the filtrate is evaporated to about a 2-liter volume at 30° C. under reduced pressure. The liquid which remains is washed with water, dried with sodium sulfate, and evaporated at 30° C. under reduced pressure. The oily residue (60 g.) is chromatographed on 3 kg. of silica gel wet packed in Skellysolve B (a mixture of isomeric hexanes), eluting successively with a gradient of 4 l. of Skellysolve B and 4 l. of 20% ethyl acetate in Skellysolve B, 27 l. of 20%, 18 l. of 50%, and 8 l. of 75% ethyl acetate in Skellysolve B, collecting 600-ml. fractions. Fractions 39–60 are combined and evaporated to give $PGA_2$ acetate methyl ester. Fractions 74–76 are combined and evaporated to give 1.03 g. of $PGA_2$ methyl ester. Between fractions 60 and 74 those fractions shown by TLC to contain $PGA_2$ acetate are evaporated to yield that compound.

Example 1 $PGA_2$

Water (one ml.) is added to a solution of $PGE_2$ (0.158 g.) in 9 ml. of acetic acid. The mixture is heated 18 hours at 65° C. under nitrogen. Then, the mixture is cooled and evaporated under reduced pressure. A mixture of diethyl ether and water is added to the residue. The ether layer is separated, dried with anhydrous sodium sulfate, and evaporated. The residue is chromatographed on a 20-g. column of silica gel wet-packed with 20% ethyl acetate in cyclohexane, eluting with increasing percentages of ethyl acetate in cyclohexane. Those eluate fractions showing a single spot different than the $PGE_2$ spot on thin layer chromatography on silica gel with the A-IX system are combined and evaporated to give 60 mg. of $PGA_2$ essentially free of $PGE_2$. This $PGA_2$ is purified further by preparative thin layer chromatography on silver nitrate-impregnated silica gel plates with the A-IX system (ascending), locating the $PGA_2$ with ultraviolet light, and extracting the plate portions containing the $PGA_2$ with methanol. The methanol extracts are evaporated, and the residue is partitioned between diethyl ether and water (pH 2). The ether layer is separated, dried with anhydrous magnesium sulfate, and evaporated to give 42 mg. of $PGA_2$; U.V. maxium in ethanol at 217 m$\mu$ ($\epsilon$ 9,900); infrared absorption (mineral oil mull) at 3,400, 1,705, 1,580, 1,255, 1,115, 1,070, and 1,015 cm.$^{-1}$; N.M.R. spectral peaks at 6.17, 7.52, 5.2–5.7, 4.1, and 3.26 $\delta$ (Varian A-60; deuterochloroform solution; tetramethylsilane as internal standard).

Example 2 $PGA_3$

Following the procedure of Example 1, $PGE_3$ is dehydrated to $PGA_3$, the latter being obtained essentially free of the $PGE_3$ reactant by the procedure described in Example 1.

Example 3 13,14-Dihydro-$PGA_1$

Following the procedure of Example 1, dihydro-$PGE_1$ is dehydrated to 13,14-dihydro-$PGA_1$, the latter being obtained essentially free of the dihydro-$PGE_1$ reactant by the procedure described in Example 1.

Example 4 $PGA_2$ Methyl Ester.

Following the procedure of Example 1, $PGE_2$ methyl ester is dehydrated to $PGA_2$ methyl ester, the latter being obtained essentially free of the $PGE_2$ methyl ester reactant by the procedure described in Example 1.

Also following the procedure of Example 1, the ethyl, propyl, isobutyl, tert-butyl, and 2-ethylhexyl esters of $PGE_2$ are each dehydrated to the corresponding esters of $PGA_2$, the latter esters each being obtained essentially free of the $PGE_2$ ester reactant.

Also following the procedure of Example 1, the methyl, ethyl, propyl, isobutyl, tert-butyl, and 2-ethylhexyl esters of $PGE_3$ and of dihydro-$PGE_1$ are each dehydrated to the corresponding esters of $PGA_3$ and 13,14-dihydro-$PGA_1$, respectively, these latter PGA-type esters each being obtained essentially free of the $PGE_3$ ester reactant or the dihydro-$PGE_1$ ester reactant, respectively.

Example 5 $PGA_2$ Methyl Ester

Diazomethane (about 200 mg.) in diethyl ether (5 ml.) is added to a solution of $PGA_2$ (5 mg.) in a mixture of methanol (3 ml.) and diethyl ether (3 ml.). This reaction mixture is maintained at 25° C. for 5 minutes. Then, the reaction mixture is evaporated to give $PGA_2$ methyl ester with substantially the same properties as the ester of Example 4.

Following the procedure of Example 5 but using $PGA_3$ in place of $PGA_2$, $PGA_3$ methyl ester is obtained.

Following the procedure of Example 5 but using 13,14-dihydro-$PGA_1$ in place of $PGA_2$, 13,14-dihydro-$PGA_1$ methyl ester is obtained.

Also following the procedure of Example 5 but using diazoethane, diazobutane and 1-diazo-2-ethylhexane each in place of the diazomethane, there are obtained the ethyl, butyl, and 2-ethylhexyl esters of $PGA_2$.

Also following the procedure of Example 5 but using $PGA_3$ in place of $PGA_2$ and diazoethane, diazobutane, and 1-diazo-2-ethylhexane each in place of the diazomethane, there are obtained the ethyl, butyl, and 2-ethylhexyl esters of $PGA_3$.

Also following the procedure of Example 5 but using 13,14-dihydro-$PGA_1$ in place of $PGA_2$ and diazoethane, diazobutane, and 1-diazo-2-ethylhexane each in place of the diazomethane, there are obtained the ethyl, butyl, and 2-ethylhexyl esters of 13,14-dihydro-$PGA_1$.

Example 6 $PGA_2$ Acetate

Acetic anhydride (0.5 ml.) and pyridine (2 ml.) are mixed with $PGA_2$ (20 mg.) and the mixture is left standing at 25° C. for 2 hrs. The mixture is then cooled to 0° C., diluted with 10 ml. of water, and acidified with 5% hydrochloric acid. That mixture is extracted with ethyl acetate. The extract is washed successively with 5% hydrochloric acid, 5% aqueous sodium bicarbonate solution, water, and brine, dried, and evaporated to give the title compound Mass spectral peaks at 376, 359, 344, 316, and 299.

Example 7 $PGA_2$ Acetate Methyl Ester $PGA_2$ methyl ester (10 mg.) is mixed with acetic anhydride (2 ml.) and pyridine (2 ml.). The resulting mixture is allowed to stand at 25° C. for 18 hours. The reaction mixture is then cooled externally with ice, diluted with water, and acidified with dilute hydrochloric acid to pH 1. That mixture is extracted three times with diethyl ether. The combined extracts are washed successively with dilute hydrochloric acid, dilute aqueous sodium bicarbonate solution, and water, dried, and evaporated to give $PGA_2$ acetate methyl ester with substantially the same properites as the $PGA_2$ acetate methyl ester of Preparation 2.

Following the procedure of Example 7, $PGA_2$, $PGA_3$, 13,14-dihydro-$PGA_1$, $PGA_3$ methyl ester, 13,14-dihydro-$PGA_1$ methyl ester, $PGA_2$ ethyl ester, $PGA_2$ butyl ester, and $PGA_2$ 2-ethylhexyl ester are each transformed to the corresponding acetate.

Also following the procedure of Example 7, but using propionic anhydride, isobutyric anhydride, and hexanoic anhydride each in place of the acetic anhydride, there are obtained the propionate, isobutyrate, and hexanoate of $PGA_2$ methyl ester.

Example 8 $PGA_2$ Formate Methyl Ester

Following the general procedure of Staab et al., Ann., 655, 95 (1962), $PGA_2$ methyl ester is transformed to $PGA_2$ formate methyl ester.

Following the procedure of Example 8, $PGA_2$, $PGA_3$, 13,14-dihydro-$PGA_1$, $PGA_3$ methyl ester, and 13,14-dihydro-$PGA_1$ methyl ester are each transformed to formates.

Example 9 $PGA_2$ Sodium Salt.

$PGA_2$ (2 mg.) is dissolved in 3 ml. of water-ethanol (1:1). The solution is cooled to about 10° C. and then is neutralized with an equivalent amount of 0.1 N aqueous sodium hydroxide solution. Evaporation to dryness of this neutral aqueous solution gives $PGA_2$ sodium salt.

Following the procedure of Example 9 but using in place of the $PGA_2$: $PGA_3$, 13,14-dihydro-$PGA_1$, $PGA_2$ acetate, $PGA_2$ butyrate, $PGA_3$ acetate, $PGA_3$ butyrate, 13,14-dihydro-PGA$_1$ acetate, and 13,14-dihydro-PGA$_1$ butyrate, the sodium salts of each of those acids are obtained.

Also following the procedure of Example 9 but using potassium hydroxide, calcium hydroxide, tetramethylammonium hydroxide, and benzyltrimethylammonium hydroxide each in place of the sodium hydroxide, there are obtained the corresponding salts of PGA$_2$.

We claim:

1. A compound of the formula:

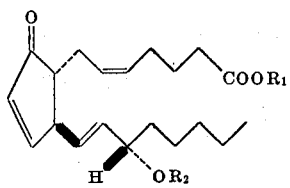

wherein R$_1$ is hydrogen or methyl and R$_2$ is hydrogen or acetyl, and the pharmacologically acceptable salts thereof where R$_1$ is hydrogen, said compounds being essentially free of the other components of colonies of the subclass Octocorallia, and essentially free of pyrogens, antigens, proteins, enzymes, cellular material, and other organic acids or salts thereof.

2. A compound according to claim 1 wherein R$_1$ and R$_2$ are hydrogen.

3. A compound according to claim 1 wherein R$_1$ is hydrogen and R$_2$ is acetyl.

4. A compound according to claim 1 wherein R$_1$ is methyl and R$_2$ is hydrogen.

5. A compound according to claim 1 wherein R$_1$ is methyl and R$_2$ is acetyl.

6. A compound of the formula:

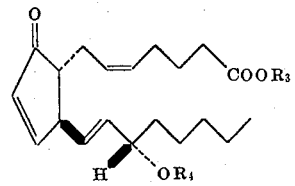

wherein R$_3$ is hydrogen or alkyl of one to 8 carbon atoms, inclusive, and R$_4$ is hydrogen, formyl, or alkanoyl of two to 8 carbon atoms, inclusive, with the proviso that when R$_3$ is hydrogen or methyl, R$_4$ is not hydrogen or acetyl, and the pharmacologically acceptable salts thereof when R$_3$ is hydrogen.

* * * * *